Dec. 12, 1967  B. F. BICKMAN  3,357,262
CONTROL APPARATUS

Filed July 28, 1965

INVENTOR.
BERNARD F. BICKMAN
BY Ronald T. Reiling
ATTORNEY

# United States Patent Office 3,357,262
Patented Dec. 12, 1967

3,357,262
CONTROL APPARATUS
Bernard F. Bickman, Minneapolis, Minn., assignor to Honeywell Inc., Minneapolis, Minn., a corporation of Delaware
Filed July 28, 1965, Ser. No. 475,382
7 Claims. (Cl. 74—5)

This invention relates to a sensitive instrument and more particularly to a low-cost sensitve instrument. The applicant has provided a low-cost instrument designed to utilize high rate production methods and automated assembly of the piece parts. The sensitive instrument is designed to utilize automatic inspection of the completed instrument. Very little machining is required to produce the sensitive instrument; all parts are die cast, stamped, or compacted from powdered metal at production rates of thousands of parts per hour.

The sensitive instrument includes a rotor element supported for rotary movement about three intersecting axes. One feature of the applicant's invention is an electrical signal generator which provides an output signal indicative of the direction and magnitude of rotation of the rotor element about one of the three axes. The signal generator comprises a wiper element supported upon the rotor for rotation relative thereto about two axes. By supporting the wiper means on the rotor, an extremely high G capability is obtained. For example, the sensitive instrument is capable of 325 G along the roll axis and 300 G radially. This high G capability cannot be obtained with prior art sensitive instruments without significantly higher cost and weight penalties. The wiper element of the signal generator cooperates with and slideably engages a resistance element mounted upon the housing of the sensitive instrument.

Another feature of the applicant's invention is a fluid valve for controlling the flow of fluid from a fluid source to the fluid support and fluid driving means of the rotor. A timing member is rotatably supported and biased in a first position wherein fluid is directed to the fluid support and fluid driving means. The flow of fluid through the valve means causes the timing member to be rotated to a second position whereby only the support means is in communication with the fluid source. This occurs only after the fluid drive means has been activated for a predetermined time.

The scope of the invention will become apparent from a study of the accompanying specification and claims in conjunction with the drawings in which:

Figure 1:
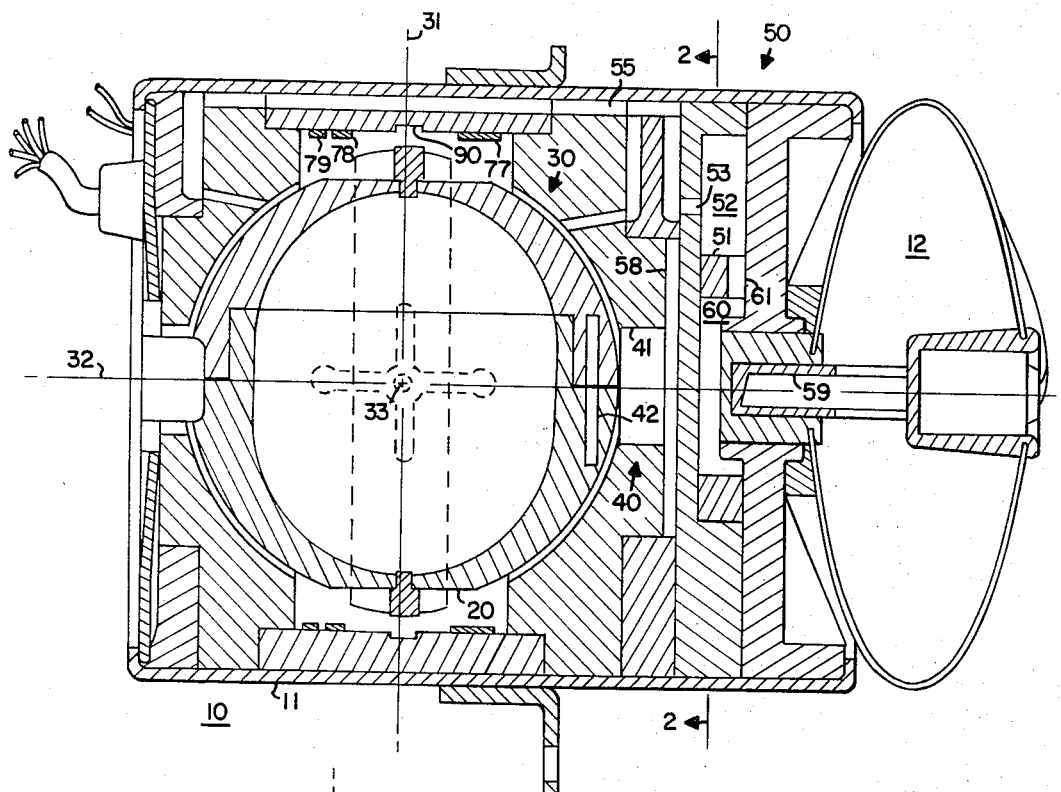
FIGURE 1 is a cross sectional view of the applicant's low cost sensitive instrument.

Referring now to FIGURE 1, reference numeral 10 generally depicts a gimballess, free rotor gyroscope. Gyroscope 10 includes a housing means 11 having a source of high pressure fluid 12 integral therewith. The source of high pressure fluid may be either a cold or hot gas generator. Of course, the source of fluid may be remote from the gyroscope 10.

A generally spherical rotor 20 is provided within housing means 11. A generally spherical hydrostatic bearing means 30 is provided within housing means 11. Hydrostatic bearing means 30 supports the rotor 20 for rotary movement about three intersecting axes 31, 32, and 33. Rotor 20 may be supported about any three axes, the axes need not be orthogonal as illustrated in FIGURE 1. As illustrated in FIGURE 1, rotor 20 is symmetrical about axis 31 which is identified as the spin axis.

Fluid driving means 40 are provided for driving rotor 20 about spin axis 31 at a predetermined angular velocity. Fluid driving means 40, in the embodiment illustrated, comprises a spin-up nozzle 41 and turbine buckets 42 on rotor 20. Spin-up nozzle 41 is supplied with fluid from source 12 through means to be explained hereinafter. Fluid exhausting from spin-up nozzle 41 impinges on turbine buckets 42 on rotor 20 causing it to rotate about spin axis 31 at a predetermined angular velocity. Other driving means, such as mechanical or electrical spin motors, may be utilized.

Figure 2:
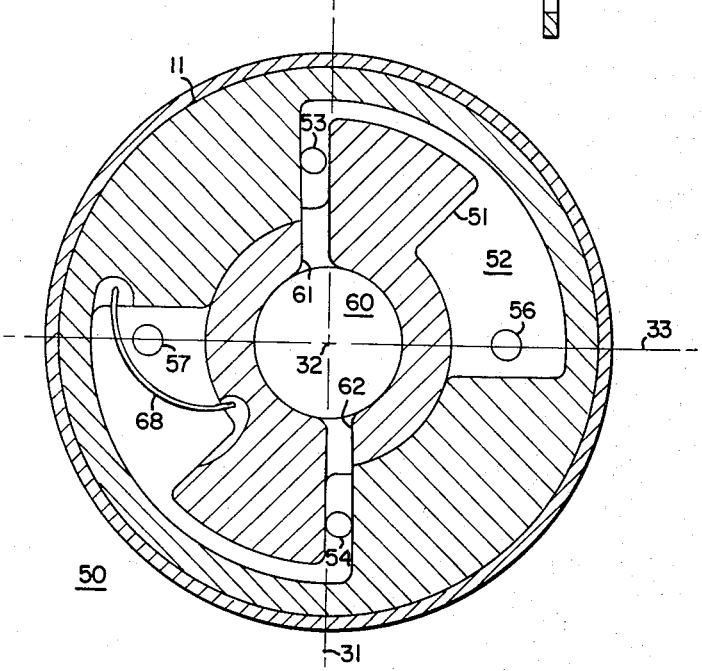
FIGURE 2 is a cross sectional view taken along section lines 2—2 of FIGURE 1.

Means including valve means 50 are provided for connecting fluid source 12 to hydrostatic bearing means 30 and fluid driving means 40. Valve means 50 is best illustrated in FIGURE 2. Valve means 50 comprises a timing member 51 positioned within a chamber 52 in housing means 11. Timing member 51 is mounted for rotation about axis 32. Chamber 52 has a first pair of ports 53 and 54 which are in communication with hydrostatic bearing means 30 through conduit means 55. Only a single port is necessary. Chamber 52 has a second pair of ports 56 and 57 which are in communication with fluid driving means 40 through conduit means 58. Only a single port is necessary. Chamber 52 is in communication with fluid source 12 through a suitable control means 59. As illustrated, control means 59 comprises a squib actuated plunger that places fluid source 12 in communication with chamber 52. More specifically, the fluid flows from fluid source 12 into a central aperture 60 in timing member 51. The fluid exhausts from aperture 60 through radial passages 61 and 62 in timing member 51 into chamber 52.

Timing rotor 51 is biased in a first position, as illustrated in FIGURE 2, by spring means 68. With timing member 51 in the first position, pressure ports 53 and 54 are in communication with hydrostatic bearing means 30 through conduit means 55. Thus hydrostatic bearing means 30 is in communication with fluid source 12. When timing rotor 51 is in the first position, ports 56 and 57 are in communication with fluid driving means 40 through conduit means 58. Thus fluid driving means 40 is in fluid communication with fluid source 12.

In operation, a portion of the fluid flowing through radial passages 61 and 62 in timing member 51 flows through ports 53 and 54 to hydrostatic bearing means 30. The remaining portion of the fluid flows through the space in chamber 52 between the outer periphery of timing member 51 and housing means 11 to ports 56 and 57 and then to driving means 40. The flow of fluid through chamber 52 creates pressure forces and viscous forces on timing rotor 51 that are effective to rotate it to a second position. In the second position timing member 51 closes off ports 56 and 57 and no fluid is supplied to fluid driving means 40. However, fluid is still supplied to hydrostatic bearing means 30 through ports 53 and 54 and conduit means 55. Thus valve means 50 functions to initially supply fluid to both hydrostatic bearing means 30 and fluid driving means 40. After rotor 20 is rotated about spin axis 31 to a predetermined angular velocity by driving means 40, valve means 50 shuts off the supply of fluid to the driving means while continuing to supply fluid to hydrostatic bearing means 30.

Figure 3:
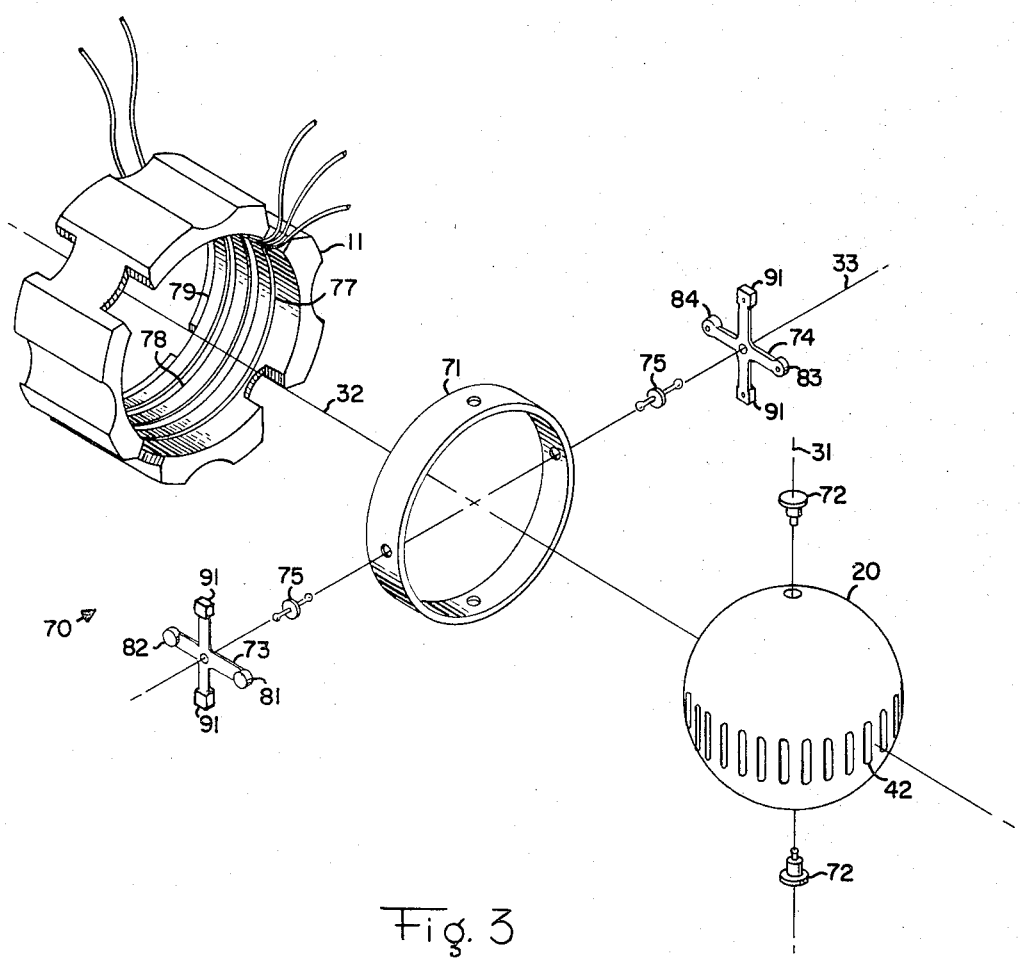
FIGURE 3 is an exploded view of the applicant's electrical signal generator.

An electrical signal generator 70 is provided for sensing the magnitude and direction of rotor 20 rotation about axis 32. Signal generator 70 is best illustrated in FIGURE 3. Signal generator 70, in the embodiment illustrated, comprises a support member 71 that is mounted upon rotor 20 by bearing means 72 for rotation relative to rotor 20 about axis 31. It should be pointed out that support member 71 is supported by rotor 20 which in turn is supported by hydrostatic bearing means 30. A pair of wiper elements 73 and 74 are pivotally mounted upon support member 71 for rotation relative to rotor 20 about axis 33 by means of pivot elements 75. It should be pointed out that only a single wiper element is necessary to provide an output signal. With this support arrangement, wiper elements 73 and 74 are mounted upon rotor 20 for rotation relative thereto about axes 31 and 33. Signal generator 70 also includes a resistance element 77 mounted on housing means 11 and circumscribing axis 32. A pair of slip rings 78 and 79 are mounted on housing means 11 and circumscribe axis 32. Wiper element 73 has contacts 81 and 82 thereon that slideably engage resistance element 77 and slip ring 78 respectively. Wiper element 74 has contacts 83 and 84 thereon that slideably engage resistance element 77 and slip ring 79 respectively. A groove 90 is provided in housing means 11 and circumscribes axis 32. Wiper elements 73 and 74 each have two buttons 91 which ride in groove 90. Buttons 91 riding in groove 90 function to maintain the contacts of wiper elements 73 and 74 in contact with resistance element 77 and slip rings.

In operation, the ends of resistance element 77 are connected to a voltage source through suitable leads. Resistance element 77 is center tapped and connected to ground. Leads are also connected to slip rings 78 and 79. From the above description, it is clear that wiper elements 73 and 74 are supported upon rotor element 20 for rotation relative to rotor 20 about axes 31 and 33. However, wiper elements 73 and 74 rotate with rotor 20 about axis 32 slideably engaging resistance element 77. Thus each wiper element provides an output signal indicative of the direction of rotation and the magnitude of rotation of rotor 20 relative to axis 32. The direction of rotation about axis 32 is determined by the polarity of the output signal and the magnitude of rotation is determined by the magnitude of the output signal. Only a single wiper element is necessary to provide an output signal.

Thus the applicant has provided a unique low cost sensitive instrument that has an extremely high G capability. The sensitive instrument provides an output signal indicative of the direction and amount of rotation thereof about an axis.

While I have shown and described the specific embodiment of the invention, further modifications and improvements will occur to those skilled in the art. I desire it to be understood, therefore, that this invention is not limited to the particular form shown, and I intend in the appended claims to cover all modifications which do not depart from the scope of this invention.

I claim:
1. A gyroscope comprising:
housing means;
a rotor within said housing means;
hydrostatic bearing means within said housing means;
a source of high pressure fluid integral with said housing means;
fluid driving means for rotating said rotor about a spin axis;
means including valve means for connecting the fluid source to said hydrostatic bearing means and to said fluid driving means, said valve means including a timing member rotatably mounted within a chamber in said housing means, said chamber having a first port in communication with said hydrostatic bearing means and a second port in communication with said fluid driving means, said timing member being biased in a first position whereby said first port and said second port are in communication with said fluid source, the fluid flow through said hydrostatic bearing means being effective to hydrostatically support said rotor for rotation about three intersecting axes including said spin axis, the fluid flow through said fluid driving means being effective to rotate said rotor about said spin axis at a predetermined angular velocity, the flow of fluid from said source through said chamber causing said timing member to be rotated to a second position whereby only said first port is in communication with said fluid source, said timing member being rotated to the second position only after said rotor has been rotated to the predetermined angular velocity; and electrical signal generator means including a support member mounted upon said rotor for rotation relative thereto about said spin axis, a pair of wiper elements pivotally mounted upon said support member for rotation about the second axis of the three axes relative to said rotor, said signal generator including a resistance element rigidly mounted upon housing means and circumscribing the third axis of the three axes, said resistance element adapted to be connected to a source of voltage, said wiper element slideably engaging said resistance element, the rotation of said rotor about the third axis relative to said housing causing said wiper element to slide along said resistance element whereby said signal generator provides an electrical output signal indicative of the direction and magnitude of rotation of said rotor about the third axis.

2. A gyroscope comprising:
housing means;
a rotor within said housing means;
hydrostatic bearing means within said housing means;
fluid driving means for rotating said rotor about a spin axis;
means including valve means for connecting said hydrostatic bearing means and said fluid driving means to a source of high pressure fluid, said valve means including a timing member biased in a first position whereby said hydrostatic bearing means and said fluid driving means are in communication with the fluid source, the fluid flow through said hydrostatic bearing means being effective to hydrostatically support said rotor for rotation about three axes including said spin axis, the fluid flow through said fluid driving means being effective to rotate said rotor about said spin axis at a predetermined angular velocity, the flow of fluid through said valve causing said timing member to be rotated to a second position whereby only said hydrostatic bearing means is in communication with said fluid source, said timing member being rotated to the second position only after said rotor has been rotated to the predetermined angular velocity; and electrical signal generator means including a wiper element supported upon said rotor for rotation relative thereto about said spin axis and about the second axis of the three axes, said signal generator including a resistance element rigidly mounted upon said housing means and circumscribing the third axis of the three axes, said resistance element adapted to be connected to a source of voltage, said wiper element slideably engaging said resistance element, the rotation of said rotor about the third axis relative to said housing causing said wiper element to slide along said resistance element whereby said signal generator provides an electrical output signal indicative of the magnitude and direction of rotation of said rotor about the third axis.

3. A gyroscope comprising:
housing means;
a rotor within said housing means;
hydrostatic bearing means within said housing means;
fluid driving means for rotating said rotor about a spin axis;
means for connecting said hydrostatic bearing means and said fluid driving means to a source of high pressure fluid, the fluid flow through said hydrostatic bearing means being effective to hydrostatically support said rotor for rotation about three axes including said spin axis, the fluid flow through said fluid driving means being effective to rotate said rotor about said spin axis at a predetermined angular velocity; and electrical signal generator means including a wiper element supported upon said rotor for rotation relative thereto about said spin axis and the second axis of the three axes, said signal generator including a resistance element rigidly mounted upon said housing means and adapted to be connected to a source of voltage, said wiper element slideably engaging said resistance element, the rotation of said rotor about the third axis of the three axes relative to said housing causing said wiper element to slide along said resistance element whereby said signal generator provides an electrical output signal indicative of the rotation of said rotor about the third axis.

4. A gyroscope comprising:
housing means;
a rotor within said housing means;
hydrostatic bearing means within said housing means;
fluid driving means for rotating said rotor about a spin axis; and
means including valve means for connecting said hydrostatic bearing means and said fluid driving means to a source of high pressure fluid, said valve means including a timing member biased in a first position whereby said driving means are in communication with the fluid source, the fluid flow through said hydrostatic bearing means being effective to support said rotor for rotary movement about three axes including said spin axis, the fluid flow through said fluid driving means being effective to rotate said rotor about said spin axis at a predetermined angular velocity, the flow of fluid through said valve causing said timing member to be positioned in a second position so as to interrupt the communication between said driving means and said fluid source, and said timing member being rotated to the second position only after said rotor has been rotated to the predetermined angular velocity.

5. A gyroscope comprising:
housing means;
a rotor supported within said housing means for rotary movement about three axes;
means for rotating said rotor about a spin axis at a predetermined angular velocity; and
electrical signal generator means including a wiper element supported upon said rotor for rotation relative thereto about the spin axis and the second axis of the three axes, said signal generator including a resistance element rigidly mounted upon said housing means and circumscribing the third axis of the three axes, said resistance element adapted to be connected to a source of voltage, said wiper element slideably engaging said resistance element, the rotation of said rotor about the third axis relative to said housing causing said wiper element to slide along said resistance element whereby said signal generator provides an output signal indicative of the rotation of said rotor about the third axis.

6. In an instrument of the class having a housing means enclosing a rotor supported for displacement relative to three axes, the combination with electrical signal generator means including a wiper element supported upon said rotor for rotation relative thereto about the first and second axes of the three axes, said signal generator including a resistance element mounted upon said housing means and adapted to be connected to a source of voltage, said wiper element slideably engaging said resistance element, the rotation of said rotor about the third axis of the three axes relative to said housing causing said wiper element to slide along said resistance element whereby said signal generator provides an electrical output signal indicative of the displacement of said rotor relative to the third axis.

7. A fluid valve comprising:
a housing means having a chamber therein, said chamber having an inlet passage in communication with a fluid source, said chamber having a first port in communication with a first outlet passage and a second port in communiction with a second outlet passage;
a timing member rotatably mounted within said chamber, said timing member being biased in a first position whereby said first port and said second port are in communication with the fluid source, the flow of fluid from said source through said chamber causing said timing member to be rotated to a second position whereby only said first port is in communication with said fluid source.

References Cited
UNITED STATES PATENTS

| | | | |
|---|---|---|---|
| 3,115,784 | 12/1963 | Parker | 74—5.7 X |
| 3,139,758 | 7/1964 | Lahde | 74—5.6 |
| 3,165,282 | 1/1965 | Noyes | 74—5.6 X |
| 3,187,588 | 6/1965 | Parker | 74—5.7 X |
| 3,254,538 | 6/1966 | Thomson et al. | 74—5.7 |

FRED C. MATTERN, Jr., *Primary Examiner.*

J. D. PUFFER, *Assistant Examiner.*